United States Patent [19]

Buffat et al.

[11] Patent Number: 5,164,855
[45] Date of Patent: Nov. 17, 1992

[54] COUNTER ELECTRODE FOR ELECTROCHROMIC SYSTEMS

[75] Inventors: Bernard Buffat; Francois Lerbet; Francis Defendini, all of Paris; Christian Padoy, Gonesse, all of France

[73] Assignee: Saint-Gobain Vitrage, Aubervilliers Cedex, France

[21] Appl. No.: 438,566

[22] Filed: Nov. 17, 1989

[30] Foreign Application Priority Data

Nov. 21, 1988 [FR] France .................. 88 15086

[51] Int. Cl.$^5$ ............................. G02F 1/01
[52] U.S. Cl. .................. 359/270; 359/269; 359/273
[58] Field of Search ........ 350/357, 353; 359/269, 359/270, 273

[56] References Cited

U.S. PATENT DOCUMENTS

| | | | |
|---|---|---|---|
| 4,303,748 | 12/1981 | Armand et al. | 429/192 |
| 4,761,061 | 8/1988 | Nishiyama | 350/357 |
| 4,805,996 | 2/1989 | Carlson | 350/357 |
| 4,887,890 | 12/1989 | Scherber et al. | 350/357 |
| 4,923,289 | 5/1990 | Demiryont | 350/357 |

FOREIGN PATENT DOCUMENTS

| | | |
|---|---|---|
| 13199 | 7/1980 | European Pat. Off. |
| 2593321 | 7/1987 | France |
| 59-102216 | 6/1984 | Japan |
| 60-28630 | 2/1985 | Japan |

OTHER PUBLICATIONS

Cogan et al., "Electrochemical Investigation of Electrochromism in Transparent Conductive Oxides," *Applied Optics*, vol. 24, No. 15 (Aug. 1985), pp. 2282–2283.
Lampert et al., "Chemical and Optical Properties of Electrochromic Nickel Oxide Films", *Solar Energy Materials*, vol. 18, No. 3/5 (Nov. 1986), pp. 161–174.

*Primary Examiner*—William Mintel
*Assistant Examiner*—Roy Potter
*Attorney, Agent, or Firm*—Pennie & Edmonds

[57] ABSTRACT

The invention pertains to an electrochromic system composed of a lithium ionic conductor electrolyte and a counter electrode symmetrical with the principal layer of electrochromic material and composed of a layer of nickel oxide, preferably deposited by reactive cathode sputtering in the presence of hydrogen-bearing plasma. The invention is used in particular for electrochromic windows, which can be used, for example, in automobile tops.

22 Claims, 2 Drawing Sheets

COUNTER ELECTRODE FOR ELECTROCHROMIC SYSTEMS

FIELD OF THE INVENTION

The present invention pertains to electrochrome systems and, in particular, the application of such systems to light transmissive or reflective surfaces.

BACKGROUND OF THE INVENTION

The color in electrochrome windows or other systems is modified through the effects of potential difference. To obtain an electrochrome condition, a layer of a transition metal oxide is placed between two electric conducting layers An electrolyte layer is interposed between the electrochrome layer and one of the two conducting layers.

Most of the ion-conducting elements in the first column of the MENDELEEV periodic table are suitable electrolytes. Electrochrome systems have thus been described using sulfuric acid or any other strong acid placed in contact with a layer of tungsten oxide. The major inconvenience of protonic electrolyte conductors, however, is their acidic nature which can result in the rapid deterioration of the other layers in the system if proper precautions are not taken. The longevity of such systems is therefore extremely short.

This defect can be reduced through the use of less corrosive alkaline ion conductor materials; in particular, lithium electrolytes are preferred in view of the high diffusion speed of lithium ions, especially in tungsten trioxide, which provides rapid coloration and decoloration of the system. Moreover, to improve the contrast between the colored and decolored states of the system, U.S. Pat. No. 4,350,414 shows how a counter electrode symmetrical to the electrode formed by the layer of electrochrome materials can be used to insert ions during the decoloration phase and to release them during the coloration phase.

This raises the technical problem of finding a suitable material for the counter electrode, that is to say, perfectly compatible with the electrolyte used, which does not decompose under an electric current and above all which does not have any coloration—or is in a decolored state when the layer of electrochrome material is also in decoloration. This last condition is essential for the realization of light transmissive windows, which might be used, for example, as windows for buildings.

SUMMARY OF THE INVENTION

It is therefore an object of this invention to provide a counter electrode of a material which is compatible with the electrolyte used, which does not decompose under an electric current, and which does not have coloration, at least when the electrochromic material does not.

The present invention accomplishes this by providing an electrochrome window for light transmission composed of a transparent substrate, in particular glass, coated with a transparent electroconductive layer; a layer of electrochromic material composed of a transition metal oxide, notably tungsten trioxide; a layer of a lithiumien containing ionic conductor material; a counter electrode of nickel oxide; and a second conductive layer, preferably one that is also transparent.

DETAILED DESCRIPTION OF THE PREFERRED EMBODIMENTS

Figure 1:
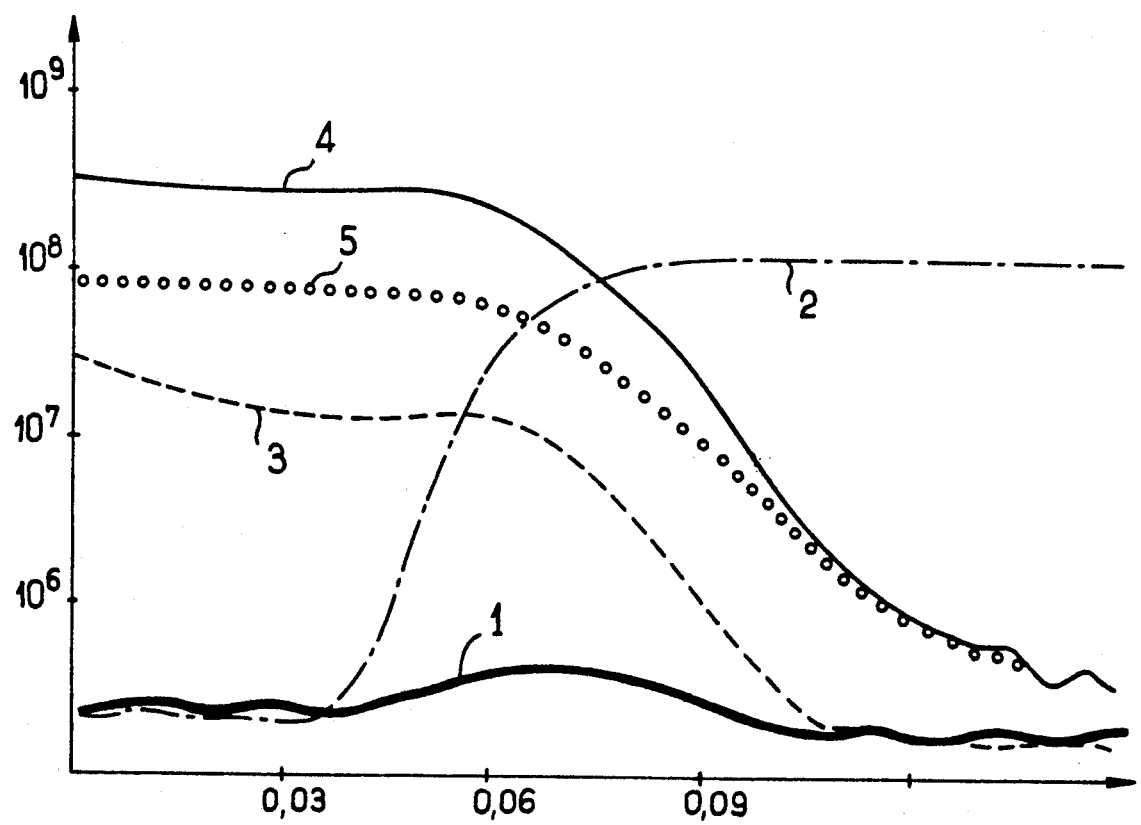
FIG. 1 is a graph of the results of mass spectrometry analysis of a nickel oxide of the Ni(O)$_A$ type.

In this invention, the counter electrode is composed of a layer of nickel oxide. As the tests reported below show, the inventors noted that the insertion of lithium ions can be perfectly reversible in such a layer of nickel oxide. For reasons indicated below, it is preferable to use hydrated nickel oxide prepared, for example, according to the conditions explained below.

The inventors noted that under certain conditions nickel oxide is capable of inserting and releasing lithium ions under the effects of potential difference. However, the electrochromic property of this material was observed to be anodic, which is an advantage over tungsten oxide, whose electrochromism is cathodic. In other words, it is the decoloration, and not the coloration, that is observed when lithium ions are inserted in a layer of nickel oxide. When associated with a layer of tungsten oxide, a nickel oxide counter electrode provides a major improvement in contrast.

The electrochrome nature of nickel oxide has certainly been known for several years, however, in systems whose cycle takes place in potash. In this case, the reaction diagram generally accepted is as follows:

I indicates that the oxide is non-colored, C that it is in a colored state (nickel oxide has a brown coloration).

According to the discovery by the inventors, this cycle can also be made with lithium ions, instead of protons, and can be diagrammed as follows:

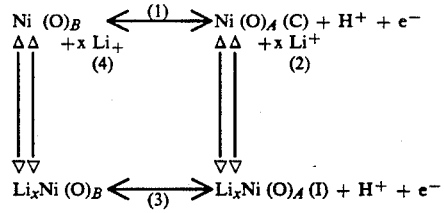

Thus, 3 supplementary electrochrome equilibriums have been defined. The invention is specifically interested in reaction No. 2, which concerns the highest current densities. If a counter electrode in a permanently decolored state is desired, for example, to avoid all coloration interferences, it is preferable to use reaction No. 4. However, this would not be the most preferable one because the current densities are approximately 6 times weaker than for reaction No. 2. Equilibrium No. 3 is possible, but this hypothesis has not been verified.

Equilibrium (2) is favoured when an oxide is used with an O/Ni stoichiometric ratio of about 1.60. After preparation and before the insertion of lithium ions, the layers are left in an oxidizing atmosphere for the shortest duration possible in order to avoid an increase in the O/Ni ratio caused by oxygen in the air before the system can be assembled.

From the proposed reaction diagrams and given the nickel-oxygen stoichiometry, it is clear that nickel oxide should be understood to mean a combination of hydrated oxides in which the nickel is at various degrees of oxidation. In any case, we use the formulas:

$$Ni(O)_A \text{ and } Ni(O)_B$$

rather than the formulas:

$$NiO(OH) \text{ and } Ni(OH)_2.$$

when most of the nickel oxide tends to be in a +3 or +2 oxidized state respectively, in order to distinguish between the two major types of hydrated nickel oxides used. However, this is due more to a conventional manner of speaking, given the fact that the analytic methods used cannot practically judge actual hydration states and therefore use the following formulas:

$$Ni(OH)_x \text{ and } nH_2O.$$

The nickel oxide layer may be deposited by reactive cathodic sputtering or any other known technique for depositing a thin film of oxide on a glass substrate.

The $Ni(OH)_A$ type layer is obtained directly by reactive cathodic sputtering. The $Ni(OH)_B$ type layer is obtained through the reduction of an $Ni(OH)_A$ type layer in potash by applying a potential difference of −0.6 volts in relation to the calomel reference electrode.

The thickness of the nickel oxide layer is preferably chosen between 60 and 300 nanometers and is even better between 80 and 100 nanometers. A thickness smaller than that is not recommended because of the increased fragility of the layers, while a greater thickness leads to products that are less transparent in the non-colored state. Above all, the supplementary insertion capacity of lithium ions obtained is useless because it exceeds the insertion capacity of the tungsten oxide layer itself.

According to one embodiment of the invention, the ionic conductor material used for the electrolyte is a liquid solution of lithium perchlorate in propylene carbonate.

According to another embodiment of the invention, the ionic conductor material is an organic conductor polymer with lithium. EP-A-13 199 gives examples of polymers suitable for the development of the invention. Good results were obtained in particular from a solid solution of lithium perchlorate in ethylene polyoxide. This organic polymer also served as an adhesive material for the assembly of compound glass, the first sheet of glass being covered with a transparent electroconductor layer and a layer of tungsten trioxide and the second sheet of glass with an electroconductor layer and the counter electrode.

According to a third embodiment of the invention, the ionic conductor material is a lithium conductor gel obtained from a titanium alkoxide in compliance with the specifications of FR-A-2 593 321.

Further favorable details and characteristics are described below through examples of the invention.

The first concern was to verify the possibility of inserting lithium ions in a layer of nickel oxide. Reactive cathodic sputtering assisted by a magnetic field was used on a silicified glass substratum to deposit a 350-nanometer layer of indium oxide made into a conductor by tin doping and carrying a square resistance of 5 Ohms.

The nickel oxide layer is deposited by cathodic sputtering assisted by a magnetic field, while operating on a target of thin nickel (preferably 2 mm thick), in order to reduce its ferromagnetic qualities. The formation of plasma could not be obtained with a thick target. The voltage is 50 volts. The plasma-producing gas is at a pressure of 3.33 Pa, with an oxygen-hydrogen ratio of 80/20. The deposit speed is 3.3 nanometers per minute. A layer is deposited with a thickness of about 80 nanometers.

The substratum prepared in this way is placed in a solution of lithium perchlorate in propylene carbonate while a given current quantity Q is applied, and then, after drying, the sample is analyzed by mass spectrometry of secondary ions under a main bombardment of positive oxygen ions. The profile thus obtained is diagramed as in FIG. 1, where the depth of the analysis is represented on the x-axis and the number of shocks or impacts received on the y-axis. First of all, it should be noted that these curves should be considered as qualitative, since the correlation between the number of impacts and the quantity of an ion is very difficult to establish. Secondly, it is not possible to observe the presence of oxygen and/or hydrogen ions from this analytical technique and the operating mode chosen.

FIG. 1 consists of 5 curves: curve 1 (thick, continuous lines) represents the background and is insignificant within the framework of this invention except to define a zero level. Curve 2 (mixed lines) corresponds to the indium ions; curve 3 (dotted lines) to the nickel ions and curves 4 and 5 to the lithium ions. Curve 4 (thin continuous lines) is obtained for a current quantity Q of 10 millicoulombs per square centimeter (10 mC/cm$^2$) and curve 5 (small circles) for a current quantity half as weak. It should be noted that curves 4 and 5 are parallel. It should also be noted that curves 4 and 5 are parallel to curve 3 which indicates a uniform distribution of lithium ions within the nickel oxide layer. Moreover, the quantity of lithium inserted with a current quantity of only 5 mC/cm$^2$ is much smaller, which demonstrates that the quantity of lithium inserted depends on the current quantity conducted through it. For a depth of zero, curve 3 presents the maximum attributed to surface oxidation.

This surface oxidation was verified by micro-probe analysis of a nickel oxide layer deposited under the same conditions as the preceding, but this time with a thickness of 280 nanometers. The oxygen/nickel ratio was 1.60 immediately after being deposited, and climbed to 1.65 for a 10 day sample.

Immediately after preparation, the nickel oxide layers are in a metastable state, which has the advantage of having the maximal insertion capacity of lithium ions (see FIG. 4), but which demands a rather rapid assembly of the system after depositing the nickel oxide layer, in order to conserve the preferred low oxygen/nickel ratio.

Figure 2:
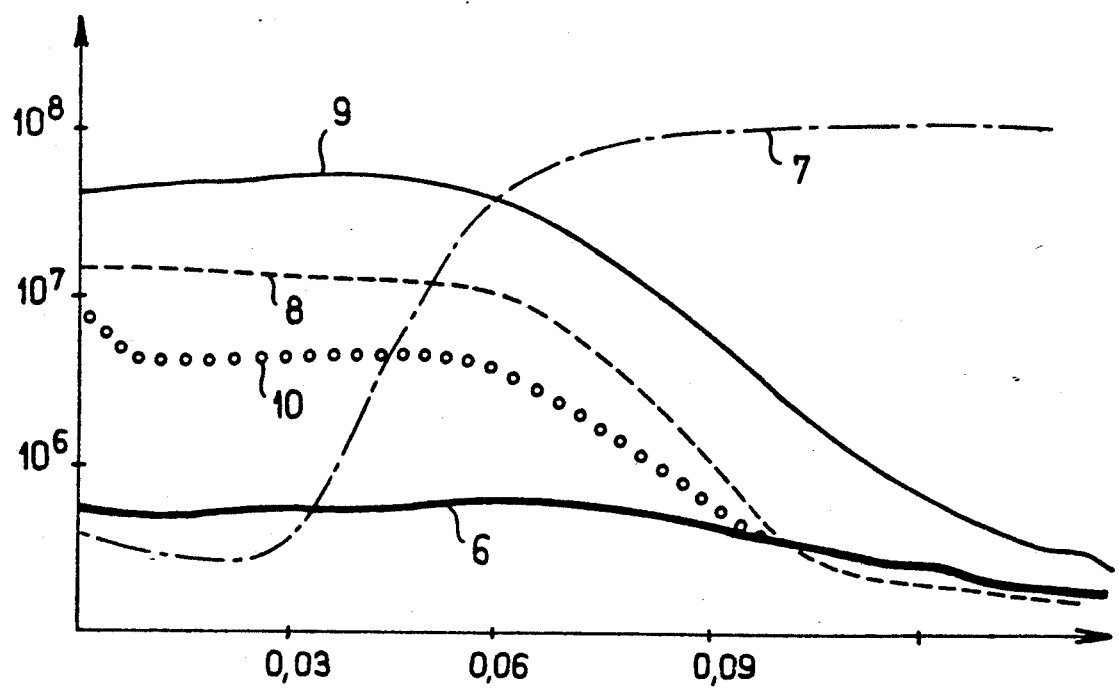
FIG. 2 is a graph of the results of mass spectrometry analysis of a nickel oxide of the Ni(O)$_B$ type.

It was also verified that the more reduced form Ni(O)$_B$ is capable of lithium insertion To do so, a Ni(O)$_A$ type layer of nickel oxide was prepared under the same conditions as the precedent and reduced in potash by applying a voltage of −0.6 Volts in relation to a calomel reference electrode (equilibrium No. 1). After lithium insertion, the profiles obtained by mass spectrometry of secondary ions were represented in FIG. 2, which uses the same conventions as in FIG. 1, so that curves 6,7,8,9, and 10 correspond respectively to the same elements as curves 1,2,3,4, and 5. The general shape of these curves is very similar to those in FIG. 1 and therefore the same conclusions apply. However, it should be noted that the quantity of lithium inserted is much smaller than for $Ni(O)_A$ and that the maximum on the surface represented by curve 10 can be attributed as before to a greater state of surface oxidation for $Ni(O)_B$.

Figure 3:
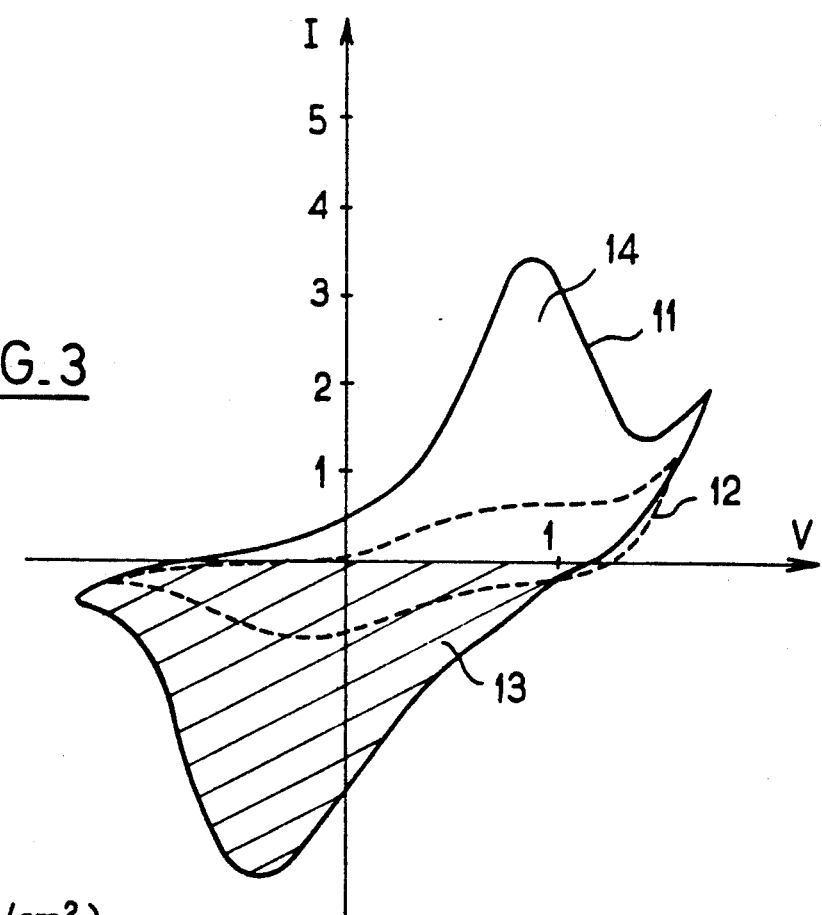
FIG. 3 is a graph of voltamperometric cycles of nickel oxide layers of the Ni(O)$_A$ and Ni(O)$_B$ types.

Through a cyclic scanning voltammeter technique, it was subsequently verified that the insertion of lithium ions in layers of 200 nanometers, prepared in the same way as the precedent, could in both cases be clearly attributed to an electrochemical reaction. The general shape of the cycles thus obtained is represented in FIG. 3 (curve 11 in continuous lines for $Ni(O)_A$ and curve 12 in dotted lines for $Ni(O)_B$. The voltage indicated on the X axis (in volts) corresponds to the potential difference in relation to a calomel reference electrode. The Y axis represents the intensity of the response current in milliamperes. The non-zero area of these cycles indicates the electrochemical insertion of lithium. Moreover, the phenomenon is clearly reversible (lower hatched area 13 is significantly the same as upper areas 14, in other words, the current quantity inserted during a cycle is recuperated in the return cycle). It was also verified that $Ni(O)_B$ has an insertion capacity much lower than $Ni(O)_A$. Finally, in the case of $Ni_A$, the light transmission during a cycle of the sample varies between 38% and 84% at a scanning speed of 20 millivolts per second, which proves that it is the lithium that causes the electrochrome phenomenon. Only one cycle per layer was represented in FIG. 4 out of the desire to simplify the graph; however, it should also be noted that a very good superimposition of curves can be obtained from successive cycles and that the phenomenon hardly changes over time.

Figure 4:
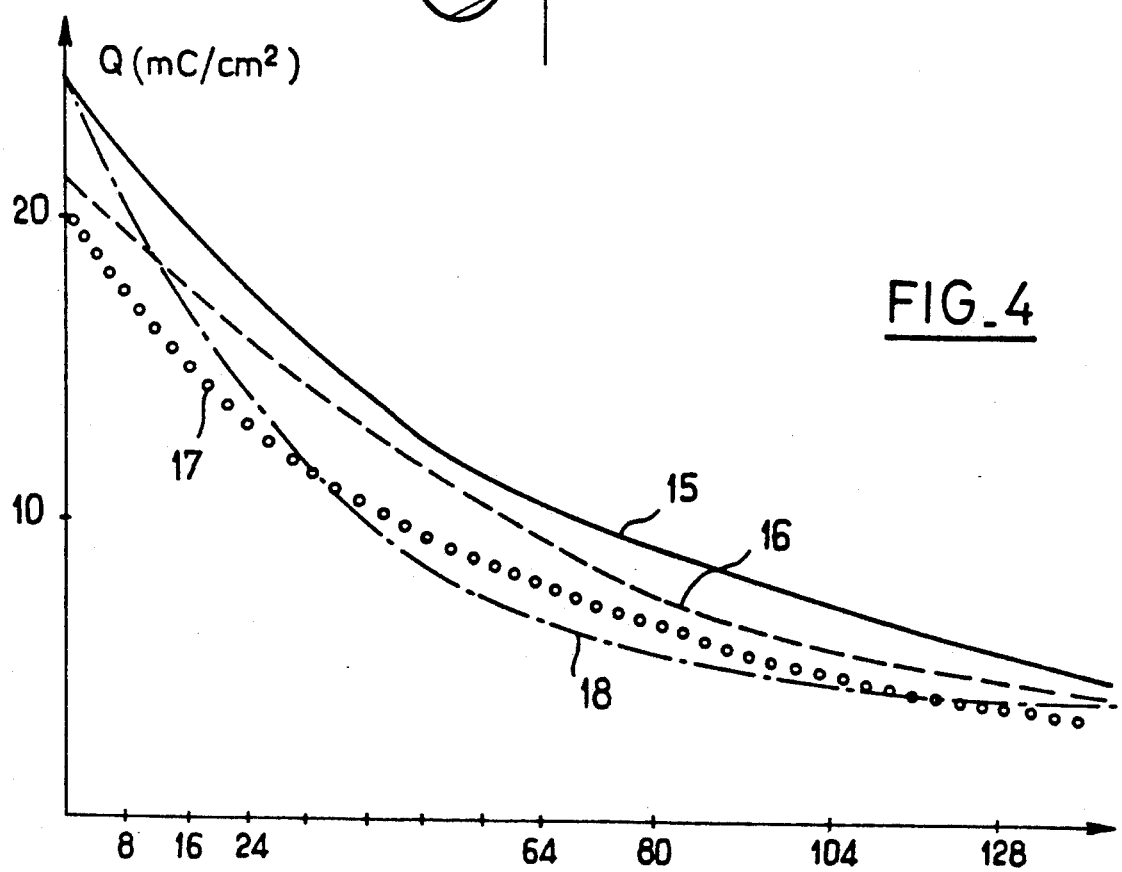
FIG. 4 is a graph of quantity of current accepted by a nickel oxide layer with relation to the time (in hours) exposure of the layer to air.

Studies were also made of the evolution over time of the nickel oxide layers of the $Ni(O)_A$ type preferred for the invention. FIG. 4 represents the current quantity accepted by a nickel oxide layer in relation to the time of its exposure to air. The different curves correspond to the different deposit conditions due to the different oxygen-hydrogen ratios in the plasma. For curves 15, 16, 17, and 18, the respective ratios were 80/20, 90/10, 70/30 and 60/40. The first remark is that the insertion capacity strongly diminished over time and that it is therefore preferable to seal the electrochrome cell within a brief amount of time after the deposit of the nickel oxide layer. A mass spectrometry profile of secondary ions under a main bombardment of positive argon ions while working on negative secondary oxygen ions makes evident an extremely rapid surface oxidation of these layers. In practice, the operation should take place within 12 hours following the deposit of the nickel oxide layer.

Moreover, it is preferable to maintain the nickel oxide layers under rigorously anhydrous conditions, right up to assembly. In any case, assembly is conducted in such a manner as to form a cell as sealed as possible as is well known in the art. In fact, cells assembled from nickel oxide layers that have been in contact with even relatively minor quantities of water molecules, age in an unsatisfactory manner in so far as the contrast weakens.

Through infrared spectroscopy and more particularly, according to a technique called polarization modulation reflection, this aging could be correlated to the presence of increasing quantities of hydroxyl groups.

The comparison of curves 15 through 18 also shows that the current quantity and therefore the quantity of inserted lithium ions is optimal for an oxygen-hydrogen ratio of approximately 80/20 at the moment of deposit. However, dealing with aging the best results are obtained with layers deposited under a plasma without hydrogen; the initial layer is in those conditions in upper oxidative state.

The intensity of coloration of a $Ni(O)_A$ type nickel layer depends, of course, on the thickness of this layer. Thus, under identical deposit conditions, layers of nickel oxide 60 to 180 nanometers thick in an isolated state (glass +ITO layer+NiOLi) have a visible light transmission level roughly identical and nearing 80% for all layers tested. In a colored state, light transmission varied according to thickness in a rather linear manner between a value of 45% and 18% for a thickness of 60 to 180 nanometers respectively.

Electrochrome cells were then prepared, consisting of a principal electrode of tungsten trioxide and a counter electrode of $Ni(O)_A$ type nickel oxide. Using a 100 $cm^2$ substratum of silicified glass, a 350 nanometer layer of indium oxide with tin doping was deposited bearing a square resistance of 5 Ohms. A layer of tungsten trioxide was deposited on this layer using thermal evaporation of a 320 nanometer tungsten trioxide powder. A second plate of glass of the same dimensions, coated with a layer of indium oxide with tin doping is furnished with an 80 nanometer layer of nickel oxide, deposited by reactive cathodic sputtering with an oxygen-hydrogen ratio of 80/20 in the plasma. The oxygen-nickel ratio is 1.60. This layer of nickel oxide is decolored on insertion of lithium ions. The two plates prepared in this way are then assembled and hermetically sealed using a polyoxyethylene film of 50 microns into which lithium perchlorate is dissolved. The visible light transmission of the system thus obtained is 73%.

The cell is placed in a heat chamber at a temperature of 80° C. Coloration/decoloration cycles are conducted without observing degradations, using a voltage of −1.7 Volts for coloration and +0.7 Volts for decoloration. For each cycle, the response time of the system is 1 minute, which is well suited to the development of glass for buildings or sun roofs for automobiles. In the colored phase, the systems light transmission is 32%.

Another cell was also prepared under the exact same conditions as the first, except that the electrolytic film of polyoxyethylene was substituted for a lithium conductor gel obtained from titanium alcoxide in accordance with the specifications of pending patent FR-A-2 593 321. When this cell was cycled at room temperature with a coloration and decoloration voltage equal to −1.7 Volts and +0.7 Volts respectively, a light transmission of 15% was obtained in the color phase for a cycle period of 1 minute.

The present invention specifically concerns electrochrome systems for light transmission, however it is obvious that it can also be applied to the development of reflection type electrochrome systems. It suffices to insert a reflecting metallic layer, such as a layer of silver, at the back of the system, for example, between the nickel oxide layer and the transparent conductor electrode—or in substitution of the latter. This system could then serve in the development of a day/night rear view mirror for automobiles.

What is claimed is:

1. An electrochromic system comprising a transparent substrate; a first transparent electroconductive layer upon said substrate; a layer of electrochromic material; a layer of anionic conductor material which includes lithium ions; a layer of a nickel oxide-containing counter electrode material, wherein the nickel oxide layer has a ratio of approximately 1 atom of nickel for 1.6 atoms of oxygen; and a second transparent electroconductive layer.

2. The system of claim 1 wherein the ionic conductor material is a solution of lithium perchlorate in propylene carbonate.

3. The system of claim 1 wherein the ionic conductor material is a macro-molecular lithium conductor.

4. The system of claim 1 wherein the ionic conductor material is a lithium conductor gel obtained from a base of titanium alcoxide.

5. The system of claim 1 wherein the nickel oxide is primarily in the $Ni(O)_B$ state.

6. The system of claim 1 wherein the nickel oxide is primarily in the $Ni(O)_A$ state.

7. The system of claim 1 wherein the counter electrode has a thickness between 60 and 300 nanometers.

8. The system of claim 1 wherein the ionic conductor material is a solution of lithium perchlorate in ropylene carbonate.

9. The system of claimed 1 wherein the ionic conductor material is a macro-molecular lithium conductor.

10. An electrochrochromic system comprising a glass substrate; a first transparent electroconductive metal oxide as an electrochromic materials; a layer of an ionic conductor material which includes lithium ions; a layer of a nickel oxide as a counter electrode, said counter electrode having a thickness between 60 and 300 nanometers; and a second transparent electroconductive layer;

wherein the nickel oxide layer has a ratio of approximately 1 atom of nickel for 1.6 atoms of oxygen.

11. The system of claim 10 wherein the transition metal oxide is tungsten trioxide.

12. The system of claim 11 wherein the nickel oxide counter electrode has a thickness between 80 and 100 nanometers.

13. The system of claim 12 wherein the ionic conductor material includes lithium perchlorate.

14. An electrochromic system comprising a transparent substrate; at least one electroconductive layer; a layer of an electrochromic material; a layer of an ionic conductor material; and a layer of a counter electrode material, the improvement of which comprises providing a layer of nickel oxide having a thickness between 60 and 300 nanometers as the counter electrode material;

wherein the nickel oxide layer has a ratio of approximately 1 atom of nickel for 1.6 atoms of oxygen.

15. The system of claim 14, wherein the nickel oxide layer is deposited by reactive cathodic sputtering in the presence of a hydrogen and oxygen bearing plasma.

16. The system of claim 15, wherein the nickel oxide layer is deposited by reactive cathodic sputtering assisted by a magnetic field from a metallic nickel target.

17. The sytem of claim 15 wherein the nickel target is about 2 mm thick.

18. The system of claim 15, wherein the oxygen-hydrogen ratio in the above mentioned plasma is approximately 80/20.

19. The system of claim 15 wherein the nickel oxide is primarily in the $Ni(O)_B$ state, obtained by the reduction in potash of a nickel oxide layer deposited by cathodic sputtering.

20. The system of claim 14 wherein the system is assembled no later than 12 hours after the deposit of the nickel oxide layer.

21. The system of claim 14, wherein the nickel oxide layer is maintained under rigorously anhydrous conditions before assembly.

22. An electrochromic system comprising a transparent substrate; a first transparent electroconductive later upon said substrate; a layer of electrochromic material; an ionic conductor layer comprising a solid solution of lithium perchlorate in an ethylene polyoxide; a layer of a nickel oxide-containing counter electrode material; and a second transparent electroconductive layer;

wherein the nickel oxide layer has a ratio of approximately 1 atom of nickel for 1.6 atoms of oxygen.

* * * * *